Figure 1:
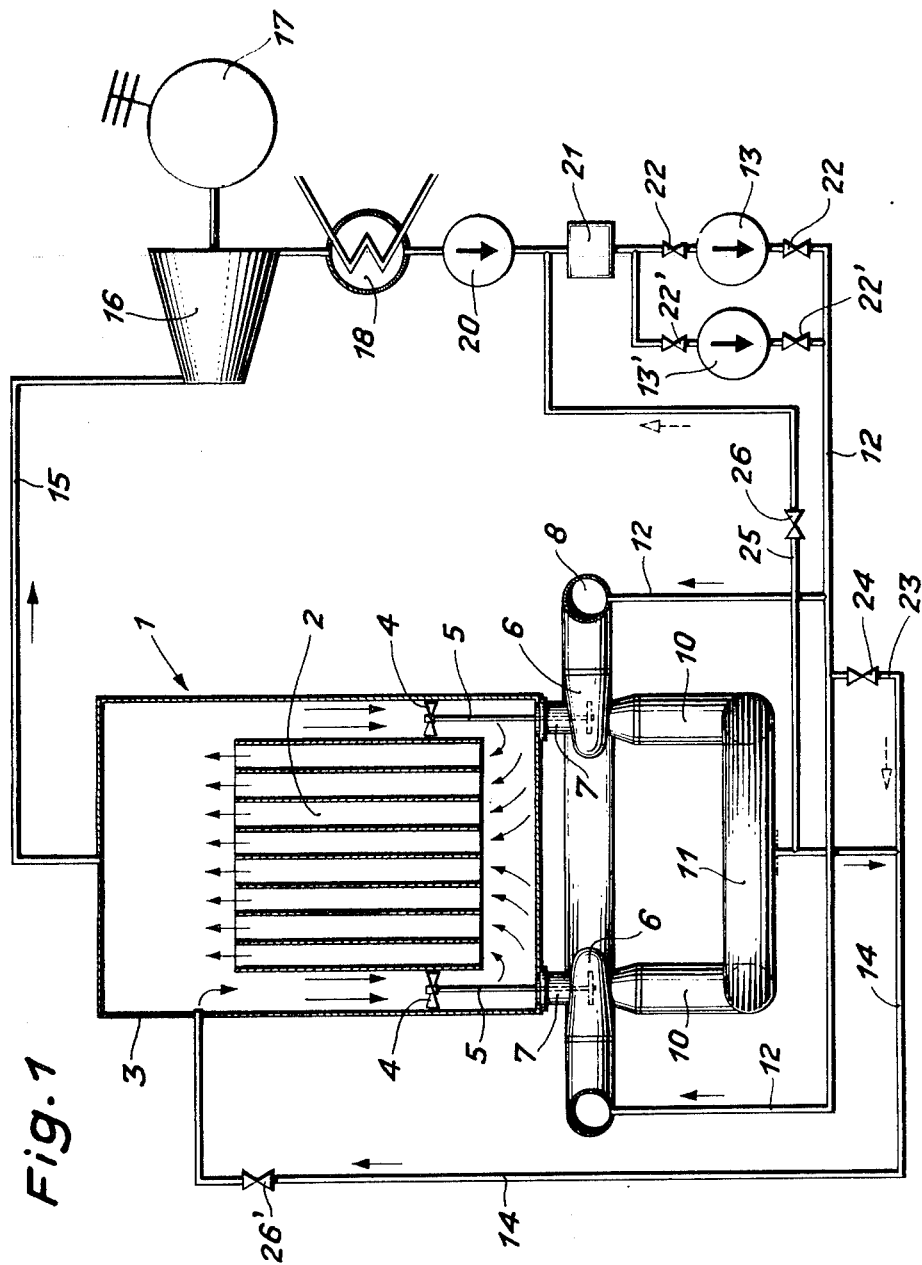

United States Patent [19]
Florjancic

[11] 3,719,557
[45] March 6, 1973

[54] CIRCULATING SYSTEM FOR A NUCLEAR REACTOR

[75] Inventor: Dusan Florjancic, Winterthur, Switzerland

[73] Assignee: Sulzer Brothers, Ltd., Winterthur, Switzerland

[22] Filed: April 15, 1970

[21] Appl. No.: 28,573

[30] Foreign Application Priority Data

May 21, 1969  Sweden .................................. 6047/69

[52] U.S. Cl. .................. 176/56, 176/54, 176/65, 60/6
[51] Int. Cl. ............................................. G21c 15/24
[58] Field of Search ....... 176/54, 55, 56, 65, 50; 60/6

[56] References Cited

UNITED STATES PATENTS

| | | |
|---|---|---|
| 3,242,053 | 3/1966 | Sander et al.............................176/56 |
| 3,296,083 | 1/1967 | Haake et al...........................176/56 X |
| 3,431,168 | 3/1969 | Kjemtrup ................................176/55 |
| 3,435,617 | 4/1969 | Wagle...................................176/55 X |
| 3,448,007 | 6/1969 | Ritz.......................................176/55 X |
| 3,467,578 | 9/1969 | Kornbichler et al.................176/54 X |
| 3,580,807 | 5/1971 | Kumpf..................................176/65 X |

Primary Examiner—Carl D. Quarforth
Assistant Examiner—E. E. Lehmann
Attorney—Kenyon & Kenyon Reilly Carr & Chapin and

[57] ABSTRACT

The circulating pump inside the pressure vessel is driven by a turbine outside the pressure vessel which in turn is driven by the flow of liquid working medium. The turbines can be situated above or below the pressure vessel. In either case, the need for seals to externally seal the pump shaft is eliminated and the axial thrust of the pump and turbine can be balanced.

12 Claims, 3 Drawing Figures

CIRCULATING SYSTEM FOR A NUCLEAR REACTOR

This invention relates to a nuclear reactor and more particularly to a circulating system for the pressure vessel of a nuclear reactor.

Nuclear reactor installations of the boiling water type have been known in which circulating pumps have been used for circulating water in the reactor core. These pumps have generally been arranged with vane wheels inside the pressure vessel of the reactor so as to provide a simpler construction than external circulating systems previously used. However, since the drive for the pump has been by means of electric motors situated outside the pressure vessel, the shafts leading from the motors to the pump impellers must pass through seals, which, due to the risk of radioactive contamination, must be completely sealed off from the exterior and therefore are complicated and expensive. Also, the axial thrust from the circulating pumps, which is caused by the internal pressure in the vessel and by the hydraulics, must be absorbed, which makes the sealing problem even greater.

Accordingly, it is an object of the invention to eliminate the need for shaft seals in the circulating system of a nuclear reactor.

It is another object of the invention to compensate for the thrust developed in the circulating system of a nuclear reactor.

It is another object of the invention to eliminate the need for thrust bearings in the pumps of a circulating system of a nuclear reactor.

Briefly, the invention provides a circulating system for a nuclear reactor in which a pump inside a pressure vessel for circulating a liquid working medium, such as water, in the pressure vessel is driven by one or more turbines outside the pressure vessel. The system further has a means for directing a flow of the working medium through the turbine in order to drive the turbine so that the turbine, in turn, drives the pump. In this way, there is either no need for shaft seals between the pump and turbines or only a need for a simple seal since a slight leakage of liquid working medium from the turbines into the reactor is harmless.

In one embodiment, the turbine for driving the circulating pump is situated outside a pressure vessel housing a reactor core of the reactor while a turbine casing connects to the pressure vessel by way of a fixed hollow element. This hollow element is sealed from the exterior and serves for the passage of a shaft from the tubine to the pump. In this embodiment, the turbine is readily accessible if such is required.

In another embodiment, one or more turbines are situated inside the pressure vessel of the reactor. In this embodiment, a ring main is connected to the turbines for a supply of the feed water into the turbines while a second ring main is connected to the tubines for conducting the feed water from the turbines into the pressure vessel. This second ring main is connected by a suitable means such as a conduit to the interior of the pressure vessel in order to facilitate the flow of feed water into the pressure vessel.

This latter embodiment permits use of the roof of the pressure vessel entirely for a fuel-element changing mechanism as is known. Further, the ring mains allow one or more of a number of circulating pumps to be shut off, for example, for adjustment or repairs.

In another embodiment, the turbines may be situated on the roof of the pressure vessel, in which case the feed water leaving the turbines is fed directly to the pressure vessel. This arrangement permits further simplification of the feed line, since a feed line for the water leaving the turbine and a pipe for supplying the water to the pressure vessel can be omitted. However, the arrangement is generally useful only when structural considerations permit siting of the turbines on the pressure-vessel roof.

In addition to the above, the circulating system has a bypass line by means of which some of the feed water can be made to bypass the turbine and can be fed directly into the pressure vessel. It is then possible to regulate the flow if only some of the feed water is needed to drive the circulating pumps.

Also, a return line may be provided, by means of which at least some of the feed water, after leaving the turbines, can be returned to a part of the circuit upstream of the feed pump. This feature, also, permits regulation, in cases where the circulating output is greater than can be provided by the feed water under the prevailing operating conditions. In particular, it is then possible to continue circulation if the reactor is shut down and the supply of feed water cut off.

In the case of the embodiment with the ring mains, each turbine can be associated with a non-return member to prevent any reflux through the turbine. Therefore, in the event a turbine ceases to operate, there will be no reflux through the turbine.

Preferably, the turbines used are Francis turbines with either fixed or adjustable guide vanes, since it has been found that, due to the flow conditions arising, they are the most suitable type of turbine for most cases. Adjustable guide vanes provide a simple means of varying the speed of the circulating pumps. Also, by varying the speed in this way, the output of the reactor can easily be varied.

When Francis turbines or turbines of similar construction are used, the turbines may be arranged in such a way that their thrust counteracts the thrust of the pumps. By means of a suitable arrangement it is even possible to produce a state in which the two thrusts cancel each other. The thrust bearings otherwise required for the pumps can then be such simpler and smaller, since in most cases the thrust bearings will only act as safety devices.

Figure 2:
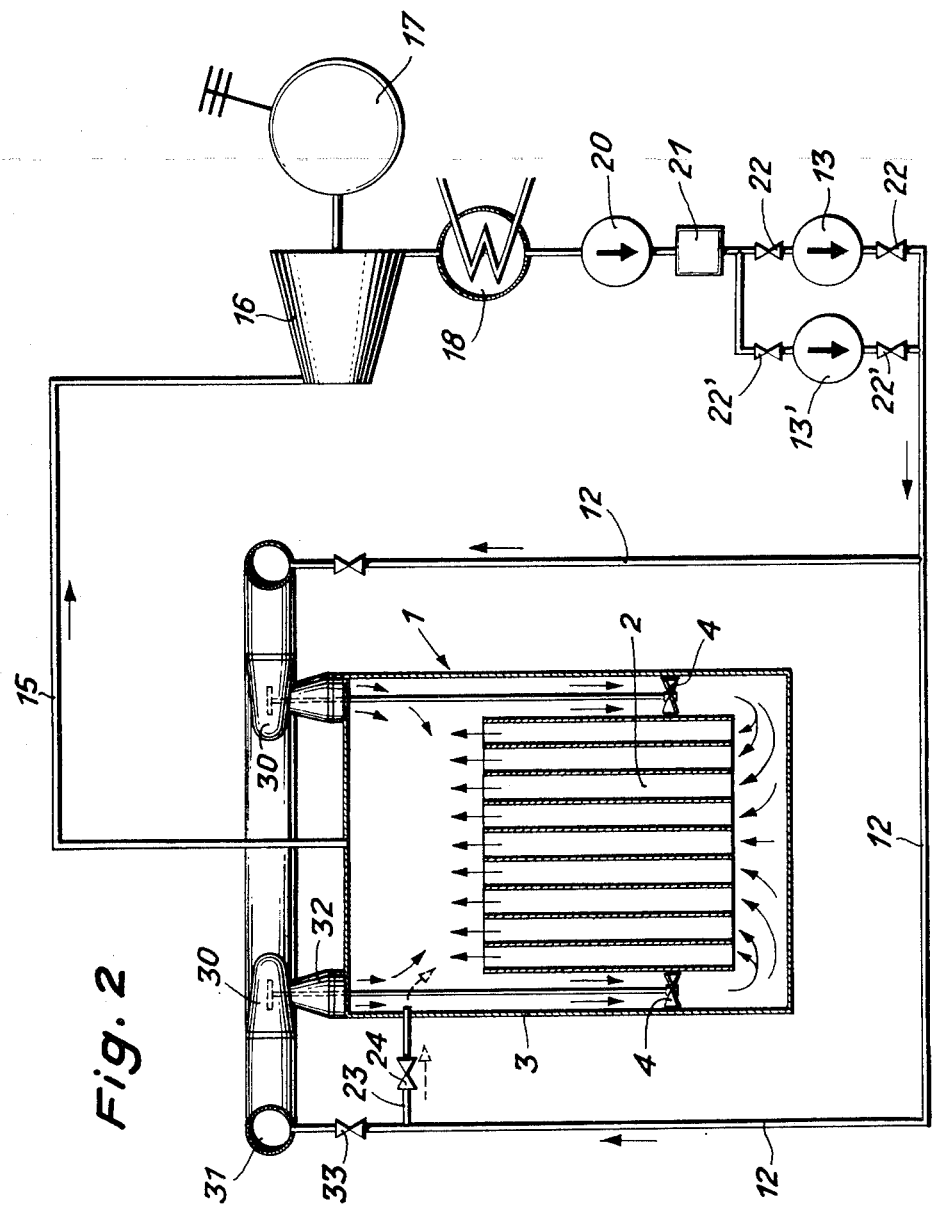
Figure 3:
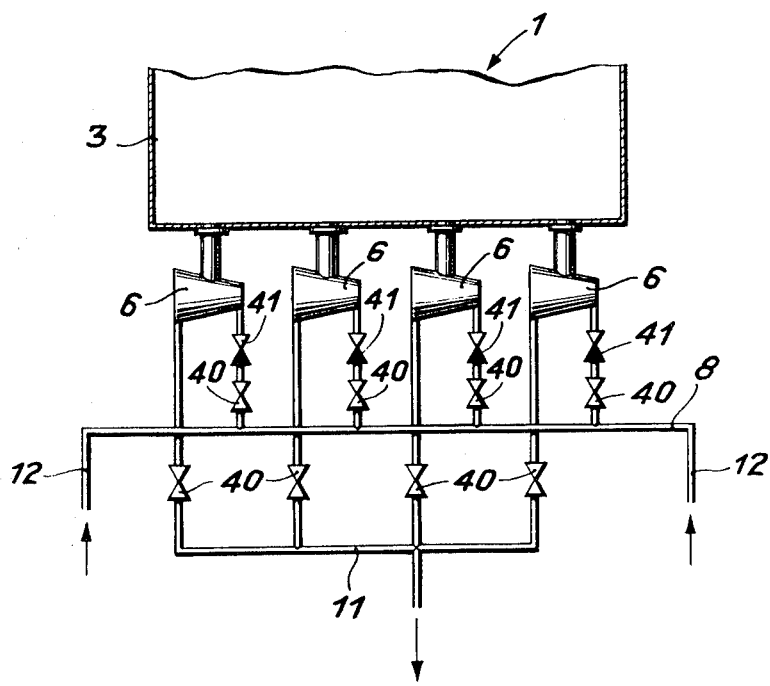

These and other objects and advantages of the invention will become more apparent from the following detailed description and appended claims taken in conjunction with the accompanying drawings in which:

FIG. 1 diagrammatically illustrates a first embodiment of a nuclear reactor installation using a circulating system according to the invention with a boiling water reactor;

FIG. 2 illustrates a modified embodiment of a circulating system according to the invention; and FIG. 3 illustrates a detail view of a plurality or turbines arranged in parallel.

Referring to FIG. 1 a nuclear reactor 1, e.g., of the boiling water type is provided with a reactor core 2 and a pressure vessel 3 in which the reactor core 2 is immersed in light water. During operation, the water evaporates due to the heat evolved in the reactor core 2 and is used to do work. In order to improve the heat transfer between the water and the fuel elements inside the reactor core 2, the water in the pressure vessel 3 is circulated by means of axial-type circulating pumps 4. Alternatively, pumps of the semi-axial type or pumps with vaned rotors could, of course, be used. The circulating pumps 4 are connected by shafts 5 to the rotors of turbines 6 located outside of and below the pressure vessel 3. The casings of these turbines 6 are connected to the pressure vessel 3 by fixed tubular elements 7 which are sealed off from the exterior and may be integral with the turbine casings. Alternatively, the elements 7 may be pipe connections which belong to the pressure vessel, and through which the shafts 5 pass. The turbines 6 are connected to one side to a ring main 8 in order to be supplied with feed water while the opposite ends of the turbines 6 are connected over pipes 10 to a ring main 11 in order to permit the feed water to leave the turbines 6.

The ring main 8 is connected by a pipe 12 to a feed pump 13 which delivers the feed water for the reactor 1. This feed water flows from the pipe 12 through the ring main 8 into the turbines 6, drives their rotors and then flows along the pipes 10 into the ring main 11. From the ring main 11, the feed water flows along a pipe 14 into the reactor 1.

The steam forming in the reactor 1 is fed along a pipe 15 to a steam turbine 16, which drives an electric generator 17. From the turbine 16, the expanded steam flows to a condenser 18. The water forming in this condenser 18 is fed by a condensate pump 20 through purifying elements 21 to the feed pump 13, so completing a circuit of the circulating system.

In addition, a pump 13' is connected in parallel with the feed pump 13 in order to act as a reserve if the first feed pump 13 fails. The two pumps 13, 13' can be shut off from the pipe 12 by means of valves 22, 22' respectively. A bypass line 23 is also placed in the circulating system which connects the pipe 12 to the pipe 14 and contains a regulating and shut-off member 24 e.g., a valve. By operating the shut-off member 24, a larger or smaller quantity of the feed water fed to the reactor 1 can be caused to bypass the turbines 6. Such bypassing is useful, for example, under partial load.

A return line 25 with a regulating and shut-off member 26 is also provided upstream of the pressure vessel 3 between the outlet main 11 and purifying elements 21 so that by opening or partially opening the member 26, a greater or smaller quantity of the water delivered by the pump 13 can be returned to the circuit upstream of the turbine 6 at the site between the condensate pump 20 and the purifying elements 21. This kind of return operation is useful in cases in which the circulation output must be greater than would correspond to the quantity of feed water fed to the reactor. A normally open regulating and shut-off member 26' in the pipe 14 may be closed or partially closed at the same time.

As shown, shaft seals leading to the exterior are not required anywhere in the transmission for the circulating pumps 4. The shafts 5 lead out of the casings of the turbines 6 through the elements 7 into the pressure vessel 3 of the reactor 1. If, due to the higher pressure in the turbine casings, a leak occurs, for example, through the shaft bearings into the pressure vessel 3, there are no adverse effects apart from the slight loss of useful driving power for the turbines 6, since the feed water is to be fed to the reactor in any case. If the rotors of the turbines 6 are so arranged as to develop an axial thrust which counteracts or even cancels out the axial thrust from the pump impellers 4, the thrust bearings otherwise required for the shafts 5 can be much simpler. In some circumstances, separate thrust bearings may even be omitted.

Referring to FIG. 2, wherein like reference numerals designate like parts as above, the turbine 30, which corresponds to the turbine 6 in FIG. 1, are situated on the roof of the reactor 1. These turbines 30 are connected to ring mains 31 substantially corresponding to the ring mains 8 in FIG. 1. However, the feed water is discharged from the turbine 30 directly into the pressure vessel 3 of the reactor through short pipes 32.

The embodiment shown in FIG. 2 has the advantage that a number of pipes can be omitted, for example, the header 11 and the pipe 14 leading from the header into the reactor. This embodiment, also, has a bypass line 23 with a regulating and shut-off member 24 therein by means of which some of the feed water can be made to bypass the turbines 30. Also, each pipe 12 contains a regulating and shut-off member 33, which serves to adjust the proportions of the water which flow through the turbine 30 and line 23.

Referring to FIG. 3, wherein like reference numerals indicate like parts as above, a plurality of turbines 6, e.g. four, below the lower end of the pressure vessel 3, are connected to the two ring mains 8, 11. Obviously, any desired number of circulating pumps and turbines may be used during operation. The various turbines 6 are connected to the ring mains 8, by shut-off members 40 such as valves so as to be shut off or removed individually. Each of the pipes leading to a turbine 6 contains a non-return member 41 which prevents feed water from flowing back through the turbine 6 if the turbine 6 does not operate. In special cases, of course, some or all of the shut-off members 40 and/or non-return members 41 may be omitted.

What is claimed is:

1. In combination with a nuclear reactor having a pressure vessel for evaporating a liquid working medium therein to vapor; a circulating system for circulating the liquid working medium in said pressure vessel, said system including at least one circulating pump inside said pressure vessel, a turbine connected to said pump for driving said pump and means including a fed pump for directing a flow of the liquid working medium through said turbine prior to flowing into said vessel to drive said turbine.

2. The combination as set forth in claim 1 wherein said turbine is outside said pressure vessel, and which further comprises a turbine casing connecting said turbine to said vessel in fluid tight manner.

3. The combination as set forth in claim 2 which further comprises a hollow element connected between said turbine casing and said pressure vessel and wherein said turbine includes a shaft connected to said pump for driving said pump, said shaft passing through said hollow element.

4. The combination as set forth in claim 1 which comprises a plurality of said pumps and said turbines, said turbines being disposed below said pressure vessel, and wherein said means includes a first ring main connected in common to said turbines for supplying a flow of the working medium into said turbines, and a second ring main connected in common to said turbine and to said pressure vessel to direct the working medium from said turbines into said pressure vessel.

5. The combination as set forth in claim 4 wherein said means includes a non-return member connected between each turbine and said second ring main to prevent reflux through said respective turbine.

6. The combination as set forth in claim 1 wherein a plurality of said turbines are positioned on the top of said pressure vessel and are connected to said pressure vessel to direct the flow of working medium therefrom directly into said pressure vessel.

7. The combination as set forth in claim 1 which further includes a by-pass line connected to said pressure vessel for by-passing at least a portion of the flow of liquid working medium around said turbine to said pressure vessel.

8. The combination as set forth in claim 1 wherein said means includes a return line connected to said turbine upstream of said pressure vessel for by-passing at least a portion of the flow of liquid working medium around said pressure vessel to a point upstream of said turbine.

9. The combination as set forth in claim 1 wherein said turbine is a Francis turbine.

10. The combination as set forth in claim 9 wherein said turbine has adjustable guide vanes.

11. The combination as set forth in claim 1 wherein said pump and turbine are connected to effect axial thrusts which cancel each other.

12. The combination as set forth in claim 1 wherein the working medium is water and said pressure vessel includes means for evaporating the water.

* * * * *